US012134204B2

(12) United States Patent
Bjarnason

(10) Patent No.: US 12,134,204 B2
(45) Date of Patent: Nov. 5, 2024

(54) FOOD ITEM CUTTING SYSTEM AND METHOD

(71) Applicant: MAREL A/S, Arhus N (DK)

(72) Inventor: Elias Halldor Bjarnason, Reykjavik (IS)

(73) Assignee: MAREL A/S, Arhus N. (DK)

( * ) Notice: Subject to any disclaimer, the term of this patent is extended or adjusted under 35 U.S.C. 154(b) by 170 days.

(21) Appl. No.: 17/281,182

(22) PCT Filed: Oct. 4, 2019

(86) PCT No.: PCT/EP2019/076969
§ 371 (c)(1),
(2) Date: Mar. 29, 2021

(87) PCT Pub. No.: WO2020/070315
PCT Pub. Date: Apr. 9, 2020

(65) Prior Publication Data
US 2021/0394385 A1 Dec. 23, 2021

(30) Foreign Application Priority Data
Oct. 5, 2018 (EP) .................................... 18198859

(51) Int. Cl.
*B26D 7/02* (2006.01)
*B26D 5/00* (2006.01)
(Continued)

(52) U.S. Cl.
CPC ............... *B26D 7/02* (2013.01); *B26D 5/007* (2013.01); *B26D 7/0625* (2013.01); *B26D 7/14* (2013.01); *B26D 2210/02* (2013.01)

(58) Field of Classification Search
CPC ................................ B26D 7/0625; B26D 7/02
See application file for complete search history.

(56) References Cited

U.S. PATENT DOCUMENTS 3,529,318 A * 9/1970 Jobmann ................ A22C 25/17 452/127
3,858,470 A * 1/1975 Solome .................... B26D 7/18 83/435

(Continued)

FOREIGN PATENT DOCUMENTS

BE 883828 A 10/1980
CN 1278473 A 1/2001

(Continued)

OTHER PUBLICATIONS

Saravacos et al., "Design and Selection of Food Processing Equipment", Handbook of Food Processing Equipment, Kluwer Academic, at least as early as Dec. 31, 2002, 8 Pages.

(Continued)

*Primary Examiner* — Sean M Michalski
(74) *Attorney, Agent, or Firm* — Workman Nydegger

(57) ABSTRACT

A cutting system and method for cutting food items includes an in-feed conveyor having an in-feed conveyor surface and an out-feed conveyor having an out-feed conveyor surface. The in-feed and the out-feed conveyors are arranged in an end-to-end arrangement. The system has a cutting knife defining a cutting plane within which it moves as it performs a cut. The cutting plane is defined between the ends of the in-feed and the out-feed conveyors. The cutting system has an out-feed hold down device with a surface facing the out-feed conveyor surface and being arranged in relation to the out-feed conveyor surface such that it is able to apply a pressure onto a portion of a food item resting on the out-feed conveyor surface while it is being cut by the cutting knife.

17 Claims, 2 Drawing Sheets

(51) Int. Cl.

| | |
|---|---|
| ***B26D 7/06*** | (2006.01) |
| ***B26D 7/14*** | (2006.01) |

(56) References Cited

U.S. PATENT DOCUMENTS

| | | | | |
|---|---|---|---|---|
| 4,813,316 | A | 3/1989 | Johnson et al. | |
| 5,320,575 | A * | 6/1994 | Fukamoto | A22C 29/025<br>83/425.2 |
| 5,370,573 | A * | 12/1994 | Warren | A22C 21/0023<br>452/160 |
| 5,378,194 | A * | 1/1995 | Hjorth | A22C 25/14<br>452/157 |
| 5,466,186 | A * | 11/1995 | Hjorth | A22C 25/14<br>452/157 |
| 5,628,237 | A | 5/1997 | Lindee et al. | |
| 5,738,577 | A * | 4/1998 | Long | A22C 17/12<br>452/171 |
| 6,044,739 | A * | 4/2000 | Abler | B26D 7/0625<br>83/410.8 |
| 6,073,527 | A * | 6/2000 | Harter | B65H 29/6609<br>83/345 |
| 6,117,247 | A * | 9/2000 | Huang | A23N 7/00<br>127/24 |
| 6,244,950 | B1 * | 6/2001 | Long | A22C 17/12<br>452/136 |
| 6,659,856 | B2 * | 12/2003 | Long | A22C 17/12<br>452/127 |
| 6,830,415 | B2 * | 12/2004 | Shiba | B23Q 11/0042<br>144/356 |
| 7,096,769 | B2 * | 8/2006 | Biggs | B26D 3/28<br>452/153 |
| 7,284,305 | B1 | 10/2007 | Allen et al. | |
| 7,481,033 | B2 * | 1/2009 | Ouellette | B65B 9/02<br>53/553 |
| 7,500,941 | B2 * | 3/2009 | Coe | A61F 13/15747<br>493/438 |
| 7,524,241 | B2 * | 4/2009 | Markert | B26D 3/28<br>452/149 |
| 7,681,380 | B2 * | 3/2010 | Ouellette | B65B 9/02<br>53/553 |
| 7,861,630 | B2 * | 1/2011 | Sorensen | A22C 25/18<br>83/42 |
| 8,517,806 | B2 * | 8/2013 | Fillenworth | A22C 7/00<br>452/179 |
| 8,683,903 | B2 * | 4/2014 | Strong | B26D 5/00<br>198/626.4 |
| 8,892,239 | B2 * | 11/2014 | Weber | B26D 7/0683<br>700/109 |
| 8,997,614 | B2 * | 4/2015 | Baechtle | B26D 7/18<br>83/318 |
| 9,003,937 | B2 * | 4/2015 | Nobukuni | B26D 1/60<br>83/37 |
| 9,016,176 | B2 * | 4/2015 | Nobukuni | B26D 7/015<br>83/485 |
| 9,545,115 | B2 * | 1/2017 | Bergman | A22C 25/17 |
| 11,528,916 | B2 * | 12/2022 | Gronkjær | A22C 25/18 |
| 2003/0079589 | A1 | 5/2003 | Kovacs | |
| 2004/0093836 | A1 * | 5/2004 | Ouellette | B65B 9/02<br>53/553 |
| 2004/0145108 | A1 * | 7/2004 | Desaulniers | B65H 29/6609<br>271/69 |
| 2004/0211323 | A1 * | 10/2004 | Heinzen | A21C 11/006<br>99/349 |
| 2005/0034576 | A1 * | 2/2005 | Ray | B26D 1/553<br>83/13 |
| 2005/0132863 | A1 * | 6/2005 | Biggs | B26D 1/147<br>83/788 |
| 2005/0132864 | A1 * | 6/2005 | Biggs | A22C 17/0033<br>83/788 |
| 2006/0065352 | A1 * | 3/2006 | Keuchel | B29C 70/20<br>156/305 |
| 2006/0118986 | A1 * | 6/2006 | Skjelmose | D21J 1/04<br>264/234 |
| 2006/0154587 | A1 | 7/2006 | Mikkelsen et al. | |
| 2006/0260454 | A1 * | 11/2006 | Hannebauer | B27B 31/06<br>83/370 |
| 2007/0107918 | A1 * | 5/2007 | Coe | B65H 45/22<br>172/695 |
| 2007/0196540 | A1 * | 8/2007 | Kirksey | A21C 9/04<br>426/94 |
| 2009/0074921 | A1 * | 3/2009 | Heinzen | A21C 11/006<br>426/446 |
| 2009/0217793 | A1 * | 9/2009 | Spillner | B26F 3/004<br>83/289 |
| 2011/0169217 | A1 | 7/2011 | Ziegler et al. | |
| 2013/0205961 | A1 | 8/2013 | Baechtle et al. | |
| 2013/0305892 | A1 * | 11/2013 | Nobukuni | B26D 1/18<br>83/13 |
| 2014/0318339 | A1 * | 10/2014 | Briel | B65G 41/002<br>83/109 |
| 2015/0033921 | A1 * | 2/2015 | Finnsson | B26D 5/007<br>83/73 |
| 2015/0122100 | A1 * | 5/2015 | Schmeiser | B26D 7/2621<br>83/674 |
| 2015/0246458 | A1 * | 9/2015 | Gahler | B26D 5/20<br>83/167 |
| 2015/0321371 | A1 * | 11/2015 | Mueller | B26D 7/0633<br>83/13 |
| 2016/0037788 | A1 * | 2/2016 | Corbin | A23L 13/00<br>426/645 |
| 2016/0075045 | A1 * | 3/2016 | Mikkelsen | B26D 7/0625<br>83/23 |
| 2016/0144527 | A1 * | 5/2016 | Achenbach | B26D 7/06<br>83/13 |
| 2016/0185002 | A1 * | 6/2016 | Mueller | B26F 1/18<br>83/563 |

FOREIGN PATENT DOCUMENTS

| | | | |
|---|---|---|---|
| CN | 103238913 | A | 8/2013 |
| CN | 104260140 | A | 1/2015 |
| CN | 205394697 | U | 7/2016 |
| CN | 206406114 | U | 8/2017 |
| CN | 108081331 | A | 5/2018 |
| DE | 102009024555 | A1 | 12/2010 |
| IT | BO20080561 | A1 | 3/2010 |
| JP | S47013099 | B | 4/1972 |
| JP | H08118288 | A | 5/1996 |
| JP | H09503650 | A | 4/1997 |
| JP | 2002238532 | A | 8/2002 |
| JP | 2003135518 | A | 5/2003 |
| JP | 2007522948 | A | 8/2007 |
| JP | 2011510886 | A | 4/2011 |
| JP | 2018134704 | A | 8/2018 |
| WO | 9503704 | A1 | 2/1995 |
| WO | 2005079588 | A1 | 9/2005 |
| WO | 2018229206 | A1 | 12/2018 |

OTHER PUBLICATIONS

Extended European Search Report from corresponding European Application No. 18198859.3, Jul. 24, 2019.

International Search Report and Written Opinion from PCT Application No. PCT/EP2019/076969, Feb. 26, 2020.

"Regulation (EC) No. 1935/2004 of the European Parliament and of the Council of Oct. 27, 2004 on Materials and Articles Intended to Come into Contact with Food and Repealing Directives 80/590/EEC and 89/109/EEC", Official Journal of the European Union, Nov. 13, 2004, 11 pages.

"Commission Directive 2002/72/EC of Aug. 6, 2002 Relating to Plastic Materials and Articles Intended to Come into Contact with Foodstuffs", Official Journal of the European Communities, Aug. 15, 2002, 4 pages.

"Food Processing Machinery—Basic Concepts—Part 2: Hygiene Requirements," EN 1672-2, European Standard, at least as early as Apr. 30, 2005, 40 pages.

Search Report from corresponding Chinese Application No. 201980064049.4, Oct. 13, 2022.

(56) References Cited

OTHER PUBLICATIONS

Office Action from corresponding Chinese Application No. 201980064049.4, Oct. 19, 2022.
Office Action from corresponding Chinese Application No. 201980064049.4, Mar. 8, 2022.
Search Report from corresponding Chinese Application No. 201980064049.4, Mar. 2, 2022.
Search Report from corresponding Chilean Application No. 202100824, Feb. 4, 2022.
Chinese Office Action from corresponding CN Application No. 201980064049.4, Apr. 19, 2023.
Japanese Office Action from corresponding JP Application No. 2021-517277, Oct. 17, 2023.

* cited by examiner

FOOD ITEM CUTTING SYSTEM AND METHOD

TECHNICAL FIELD

The present invention relates to the field of food item handling, and in particular to a food item cutting system comprising a cutting knife and conveyor, and a method of operating such a system.

BACKGROUND OF THE INVENTION

Various systems are known for cutting food items. One branch of such systems generally comprises at least one conveyor conveying food items towards a cutting knife. By knowing the conveying speed of the conveyor and the location of the food item on the conveyor at a given point in time, the cutting of the knife may be performed in a desired plane of the food item separating it into pieces of desired sizes. In some instances, these pieces undergo a subsequent food processing step. In such instances, it may be of outmost importance that the cut is well controlled such that the position/orientation of the pieces after the cut on a take-away conveyor is as expected.

This is however commonly not the case. As an example, if these pieces are food item strips the impact from the knife results in uncontrolled movement of the resulting food item strips, i.e. they become partly dislocated and/or partly rotated. This causes problems which in many cases can only be resolved via manual labour to e.g. re-orient the pieces.

SUMMARY OF THE INVENTION

In a first aspect, embodiments of the invention provide a cutting system for cutting food items, the cutting system comprising:

- an in-feed conveyor comprising an in-feed conveyor surface;
- an out-feed conveyor comprising an out-feed conveyor surface, the in-feed and the out-feed conveyors being arranged in an end-to-end arrangement; and
- a cutting knife having a cutting plane within which the cutting knife moves as it performs a cut, the cutting plane being defined between the ends of the in-feed and the out-feed conveyors,
- wherein the cutting system further comprises an out-feed hold down device comprising a surface facing the out-feed conveyor surface and being arranged in relation to the out-feed conveyor surface such that it is able to apply a pressure in the direction of the conveyor surface of the out-feed conveyor onto a portion of a food item resting on the out-feed conveyor surface while it is being cut by the cutting knife.

Food items may be meat items, such as meat items from e.g. cattle/cows, swine, lamb, poultry etc. The food items may e.g. be meat items with a weight less than 600 g, such as less than 500 g, less than 400 g, less than 300 g, less than 200 g, less than 100 g. The meat items may be raw, unprocessed or processed. In a preferred embodiment the meat items are poultry meat, e.g. deboned poultry leg meat.

In embodiments the food items are and/or may be differently sized with respect to each other. This may, for example, be the case with poultry products where the unique individual character of the animals entails size differences of derived items, e.g., primal cuts.

In embodiments, the cutting knife has a smooth edge (such as wherein the edge of the cutting knife is not scalloped and/or not serrated). A possible advantage of this is that no material can accumulate or stick in (the absent) recesses of the edge of the cutting knife.

In a second aspect, embodiments of the invention provide a method of cutting a food item, by use of a cutting system, the cutting system comprising:

- a cutting knife;
- an in-feed conveyor comprising an in-feed conveyor surface;
- an out-feed conveyor comprising an out-feed conveyor surface, the in-feed and the out-feed conveyors being arranged in an end-to-end arrangement; and
- an out-feed hold down device,
- the method comprising the steps of:
- conveying a food item on the conveyor surface of the in-feed conveyor;
- the food item engaging the conveyor surface of the out-feed conveyor;
- the out-feed hold down device pressing the food item against the conveyor surface of the out-feed conveyor; and
- the cutting knife cutting the food item in a cutting plane, while the food item is at least being pressed against the out-feed conveyor.

Thanks to the provision of the out-feed hold down device and out-feed conveyor in conjunction with the in-feed conveyor and the cutting knife, a more controlled cut and handling of the food item may be achieved. Moreover, because the out-feed hold down device is able to apply a pressure to the food item and thereby press it against the out-feed conveyor, the risk of uncontrolled movement of the food item during cutting is less likely. Such uncontrolled movement could potentially lead to an imprecise cut and thereby an imprecise cut food item portion size/weight. In some cases, the uncontrolled movement could even cause the food item and/or the cut food item portion to fall off the conveyor surface of the in-feed and/or out-feed conveyor. This could also lead to increased waste and/or lost profits.

In present context, the term ‘cut food item portion’ is to be understood as any part of a food item which has been cut from another part of a food item by the cutting knife. As a food item is conveyed by the in-feed conveyor and sequentially cut by the cutting knife, it will eventually reach or fall below a target size, which need not be reduced further. As this happens, the target size food item will not be cut further and may pass the cutting knife without being cut further. Such a target size food item may also be regarded as a cut food item portion within the present context.

Further, as the out-feed hold down device is able to press the food item against the conveyor surface of the out-feed conveyor, the friction between the food item and the conveyor surface of the out-feed conveyor can thereby be increased. This in turn improves the ability of the out-feed conveyor to cause controlled movement of the cut food item portion. The improved controlled movement of cut food item portions may be utilized for optimising the position of the cut food item portion relative to, e.g., the cutting plane of the cutting knife after the cut has been performed, which could reduce the risk of the cut food item portion sticking to the cutting knife.

Embodied systems and methods as defined herein may be utilised for sequential cutting of one or more food items into a plurality of cut food item portions. In this case, the out-feed hold down device sequentially applies pressure to the food item as it is being cut and a cut food item portion right after it has been cut. Then it applies a pressure to the food item as it is being cut and so forth. In this case, the out-feed hold down device allows improved control of the position of cut food item portions relative to each other. This in turn allows improved accuracy of the arrangement of cut food item portions on the conveyor surface of the out-feed conveyor. This improved arrangement may be utilised for transfer of the cut food item portions to a transport and/or sales food item container, while at least partially preserving the arrangement of the cut food item portions. This could minimise the need for re-arranging the cut food item portions before and/or during transfer of the cut food item portions. Further, uncontrolled movement of the cut food item portion during and/or after cutting could lead to irregular orientation and/or arrangement of the cut food item portion on the out-feed conveyor, which could be detrimental to the performance of subsequent sorting and/or packing steps, as individual cut food item portions may be more difficult to separate and/or distinguish if they are randomly orientated and/or arranged on the out-feed conveyor. For instance, some cut food item portions may be desirable to discard for re-cutting or for use in different products than the remaining cut food item portions. Such discarding may be more easily performed with the controlled orientation and/or arrangement of the cut food item portions on the out-feed conveyor.

Each of the in-feed conveyor, the out-feed conveyor, the out-feed hold down device and the cutting knife may be motorised and controlled by one or more control units of the cutting system. The in-feed and out-feed conveyors may define linear or curved paths to best suit the needs of individual users.

The system may comprise at least two in-feed conveyors running in parallel, at least in the vicinity of the cutting plane of the cutting knife. The at least two in-feed conveyors may supply food items to the cutting plane of the cutting knife from different, e.g., food item prepping systems where the food items may be prepped for being cut by being, e.g., skinned or deboned. In such embodiments, food items on the at least two in-feed conveyors may be cut simultaneously by the cutting knife. In present embodiments, the system may further comprise at least two out-feed conveyors arranged in an end-to-end arrangement with the in-feed conveyors. In this case, the cut food item portions originating from food items on different in-feed conveyors may be arranged on different out-feed conveyors leading to, e.g., different cut food item portion packing stations.

The surface of the out-feed hold down device and/or the in-feed hold down device may comprise a roller, a conveyor surface or a surface with a low coefficient of friction relative to the coefficient of friction of the conveyor surface of the out-feed conveyor. The surface of the out-feed hold down device and/or the in-feed hold down device may comprise a robotic walker linkage mechanism.

In preferred embodiments of the invention, the in-feed conveyor conveys a food item at a first speed, the out-feed conveyor conveys the food item at a second speed, and the cutting knife cuts the food item while the food item is being conveyed by the in- and out-feed conveyor. An embodied cutting system may then comprise a control unit configured to control the in-feed conveyor to convey a food item at the first speed, control the out-feed conveyor to convey the food item at a second speed, and control the cutting knife to simultaneously perform a cut while moving at a third speed.

In these cases, the food item is moving while it is being cut by the cutting knife. This allows for improved efficiency of the cutting system, as the in- and/or out-feed conveyors do not need to be stationary while the food item is being cut.

In one embodiment of the invention, the third speed is at least 10 times, such as at least 25 times, such as at least 50 times, larger than both of the first speed and the second speed. The high speed of the cutting knife relative to the conveying speeds may improve the quality of the cut. Moreover, as the speed of the cutting knife is in this case at least 10 times larger than the conveying speeds, the food item will move relatively little while being cut for improved cutting precision even though the food item is being conveyed.

The cutting may further comprise an in-feed hold down device comprising a surface facing the in-feed conveyor surface and arranged in relation to the in-feed conveyor surface such that it is able to apply a pressure onto a portion of a food item resting on the in-feed conveyor surface while being cut by the cutting knife. In this case, the fixation of the food item relative to the in-feed conveyor may further be improved by enabling the in-feed hold down device to press the food item against the conveyor surface of the in-feed conveyor. By having a more precisely controlled position of the food item relative to the in-feed conveyor, a more precisely controlled position of the food item relative to the cutting plane of the cutting knife is also achievable. This in turn allows more precise cuts and consequently less waste.

In some embodiments of the invention, the distance between the cutting plane of the cutting knife and the out-feed hold down device and/or the in-feed hold down device is less than the average length of the cut food item portions as measured in the conveying direction of the out-feed conveyor and/or in-feed conveyor, preferably less than half of said length. In this case, the effectiveness of the out-feed and/or in-feed hold down device applying a pressure on the food item towards the out-feed and/or in-feed conveyor, while the food item is being cut may be improved.

The in-feed hold down device and/or the out-feed hold down device may comprise a motorised height adjustment mechanism. In this case, the one or more motorised height adjustment mechanisms are preferably controlled by one or more control units of the cutting system for automated operation. This allows for controlled and well-defined height adjustment for improved control of the pressure the hold down device may exert on a food item. If the contour of a food item is known, the motorised hold down device may be controlled to follow the contour of the food item as it passes. Accordingly, the pressure exerted on the food item may be more precisely controlled. This allows for optimising the exerted pressure with a view to achieve a friction between the food item and the conveyor surface of the in- or out-feed conveyor large enough to immobilize the food item relative to the conveying surface, while not exerting a pressure so large that the food item deforms to a degree which caused unacceptable inaccuracy of the cut food portion size/weight.

In one embodiment, the in-feed hold down device and the out-feed hold down device are motorised by a single motorised height adjustment mechanism for enhanced synchronicity of height adjustment of the hold down devices.

According to an embodiment, the motorised height adjustment mechanism is arranged so that the height can be adjusted while a distance, such as a smallest distance, between the out-feed hold down device and/or the in-feed hold down device, and the cutting plane, remains substantially constant, such as constant. A possible advantage of this is, that it ensures that a minimum distance between each of the out-feed hold down device and/or the in-feed hold down device on the one side and the cutting plane on the other side does not increase at any time, even during adjustment of the height, where an increase could entail less optimal cutting. Another possible advantage of this is, that it ensures that a minimum distance between each of the out-feed hold down device and/or the in-feed hold down device on the one side and the cutting plane on the other side, does not decrease at any time, even during adjustment of the height, where an increase could entail that the in-feed hold down device and/or the out-feed hold down device got damaged by the cutting knife, e.g., in case of the distance approaching or becoming zero. Keeping said distance substantially constant during height adjustment could for example be realized by adjusting height by moving the portion of the in-feed hold down device and or out-feed hold down device closest to the cutting plane in a plane parallel to the cutting plane. By "substantially constant" may be understood, that the height can be adjusted (e.g., so as to move from a position away from the food item and into contact with the food item), e.g., at least 5 mm, such as least 10 mm, such as at least 50 mm, such as at least 100 mm, without said smallest distance changing, e.g., changing more than 2 mm.

In embodiments, the out-feed hold down device comprises a conveyor belt. In embodiments, the out-feed hold-down device comprises a substantially straight, such as straight, surface forming an angle with respect to the out-feed conveyor surface and wherein said angle can be adjusted without adjusting a distance between the out-feed hold down device and the cutting knife. This may, for example, be realized by rotating the out-feed hold down device (incl. the substantially straight surface) around an axis being co-axial with a pulley closest to (and adjacent to) the cutting plane.

The cutting system may further comprise a scanner arranged to scan food items upstream of the cutting plane of the cutting knife. This allows for a control unit of the cutting system to control the in-feed hold down device and/or the cutting knife and/or the out-feed hold down device on the basis of the scan.

The cutting system may further comprise a control unit configured to receive data from the scanner, compute a contour on the basis of the received data, and control the height of the in-feed hold down device and/or the out-feed hold down device on the basis of the computed contour. This allows for optimised control of each hold down device and possibly for achieving a friction between the food item and the conveyor surface of the in- or out-feed conveyor large enough to immobilize the food item relative to the conveying surface, while at the same time not exerting a pressure so large that the food item deforms to a degree which causes unacceptable inaccuracy of the cut food portion size/weight.

The cutting system may further comprise a control unit configured to receive data from the scanner and on the basis of the received data (such as on the basis of the received data and data derived therefrom, such as any one of a contour, weight, height, width, length and density), control the conveying speed of the out-feed conveyor, and/or the conveying speed of the in-feed conveyor.

A possible advantage could be that different strategies for moving two adjacent food items on either side of the cutting plane after cutting relative to each other, such as in order to separate them from each other, can be applied depending on the received data. For example, different strategies might advantageously be applied for two food items which are relatively thinner (e.g., smaller height above the conveyor) and/or lighter compared to two other food items. A possible advantage of better spatial separation may in turn be that it facilitates a better accuracy in subsequent turning and/or cutting.

In another example, a food portion which after a cut is adjacent to the cutting plane on the out-feed conveyor, and which has a height larger than its width (based on info from scanner, such as scanner and portion calculations) could be tilted (90°) by controlling out-feed conveyor speed (e.g., relative to a speed of the out-feed hold down device), so that it would be lying on its (larger) "side" and thus rest more stable on the outfeed conveyor.

Tilting would, e.g., be achieved by applying larger speed on the outfeed hold down conveyor relative to the outfeed conveyor speed.

The in-feed hold down device may comprise a conveyor having a conveyor surface facing the in-feed conveyor surface, and the out-feed hold down device may comprise a conveyor having a conveyor surface facing the out-feed conveyor surface. This allows for individual control of the conveying speed of the opposing surfaces engaging the food item or cut food item portion. Accordingly, the food item or cut food item portion may be tilted relative to the opposing conveyor surfaces. This allows for a cut food item portion to be selectively oriented to either lie down or stand up on the out-feed conveyor surface depending on the speed of the out-feed hold down conveyor relative to the out-feed conveyor.

In some embodiments of the invention, the conveyor surface of the out-feed conveyor defines a first plane and the conveying surface of the out-feed hold down device defines a second plane, wherein the first and second planes form an angle of 0-25 degrees at least in the vicinity of the cutting plane of the cutting knife, and wherein the cutting plane of the cutting knife forms an angle of 85-95 degrees with the first plane at least in the vicinity of the cutting plane of the cutting knife. In this case, the conveyor surfaces of the out-feed conveyor and the out-feed hold down device form a relatively small angle in the vicinity of the cutting plane of the cutting knife for optimising the contact area between the food item or cut food item portion and the conveyor surfaces. Also, the conveying surface of the out-feed conveyor being at least close to perpendicular to the cutting plane of the cutting knife in the vicinity thereof allows for well-defined cuts by the cutting knife.

The magnitude of the conveying speed (velocity) of the out-feed conveyor and/or the magnitude of the conveying speed (velocity) of the out-feed hold down device may be adjusted relatively to each other so that the (optionally horizontal) component parallel with the conveying direction of these two conveying speeds (velocities) differs, such as so as to rotate each food items around an axis parallel with the surface of the of the out-feed conveyor and orthogonal to a conveying direction of the out-feed conveyor. This may for example be advantageous if a centre of gravity of a food item can be lowered (e.g., in order to arrange it in a more stable orientation, e.g., in case of an elongated, upright standing food item, which is rotated so as to lie on a larger supporting surface).

In some embodiments of the invention, the conveyor surface of the out-feed conveyor defines a first plane and the conveying surface of the out-feed hold down device defines a second plane, wherein the first and second planes form a non-zero angle of less than 25 degrees (such as ]0;25[ degrees, such as [1;25[ degrees, such as [5;20] degrees) at least in the vicinity of the cutting plane of the cutting knife.

In embodiments wherein the first and second planes form a non-zero angle, the magnitude of the conveying speed (velocity) of the out-feed conveyor and/or the magnitude of the conveying speed (velocity) of the out-feed hold down device may be adjusted relative to each other so that the (optionally horizontal) component parallel with the conveying direction of these two conveying speeds (velocities) substantially matches, such as is equal to, each other.

According to an embodiment, the cutting system comprises a controller configured to control the cutting knife to perform a cut, and further to control the conveying speed of the out-feed conveyor, and/or the conveying speed of the in-feed conveyor so that the conveying speed of the out-feed conveyor, such as in a downstream direction away from the cutting plane of the cutting knife, is larger than the conveying speed of the in-feed conveyor, such as in a downstream direction towards the cutting plane of the cutting knife, after the cutting knife has performed a cut, such as immediately after the cutting knife has performed a cut and/or between the cutting knife performs two consecutive cuts. This allows a cut food item portion having been cut from the food item to be moved away from the cutting plane of the cutting knife at a larger speed than the remaining part of the food item (further elaborating comments inserted below for acceleration applies here as well mutatis mutandis). By "immediately after" may be understood within 1 second, such as within 0.5 second, such as within 0.1 second, such as within 0.01 second after the cutting knife has performed a cut.

By 'larger' may in general, in particular in the context of conveyor speed and/or acceleration, be understood at least 1% larger, such as at least 2% larger, such as at least 5% larger, such as at least 10% larger, such as at least 50% larger, such as at least 100% larger.

Each of the in-feed conveyor and the out-feed conveyor generally maintains a speed above zero before, during and after cutting. However, it is conceivable that one or both of the in-feed conveyor and the out-feed conveyor are stopped, e.g., during or immediately after cutting.

According to an embodiment, the cutting system comprises a controller configured to control:

the cutting knife to perform a cut, and further to control the conveying speed of the out-feed conveyor, and/or the conveying speed of the in-feed conveyor so that the after the cutting knife has performed a cut, such as immediately after the cutting knife has performed a cut and/or between the cutting knife performs two consecutive cuts, a distance between the adjacent food items initially on either side of the cutting knife is increased. By 'increased' may be understood 'increased' in relative terms, such as increased to be at least at least 1% larger, such as at least 2% larger, such as at least 5% larger, such as at least 10% larger, such as at least 50% larger, such as at least 100% larger, or 'increased' in absolute terms, such as increased with at least 1 mm, such as with at least 2 mm, such as with at least 5 mm, such as with at least 10 mm, such as with at least 20 mm, such as with at least 50 mm.

The cutting system may comprise a controller configured to control at least the conveying speed of the out-feed conveyor and control the cutting knife to perform a cut, and further to accelerate the conveyor surface of the out-feed conveyor away from the cutting plane of the cutting knife as the cutting knife performs a cut. This allows a cut food item portion having been cut from the food item to be accelerated away from the cutting plane of the cutting knife. Firstly, this may reduce the risk of the cut food item portion on the out-feed conveyor sticking to the cutting knife as it may retract along the same path as it cuts. Secondly, the cut food item portion is accelerated away from the food item and thus also away from the next food item portion being cut, thus reducing the risk of cut food item portions on the out-feed conveyor sticking to each other undesirably. Third, even for non-sticky cut food item portions it may be advantageous to arrange the portions apart on the out-feed conveyor to, e.g., ease the process of picking them out from each other for sorting and/or packaging purposes.

According to an embodiment, the cutting system comprises a controller configured to control at least the conveying speed of the out-feed conveyor and control the cutting knife to perform a cut, and further to accelerate the conveyor surface of the out-feed conveyor away from the cutting plane of the cutting knife after the cutting knife has performed a cut, such as immediately after the cutting knife has performed a cut and/or between the cutting knife performs two consecutive cuts.

It may be understood that "accelerate" is understood to be relative to the in-feed conveyor, such as accelerate may imply that there is a positive acceleration gradient in a downstream direction across the cutting plane. Accelerate may imply that an acceleration of the out-feed conveyor is larger than an acceleration of the in-feed conveyor (taking sign into account, such as a positive acceleration gradient in a downstream direction can be achieved in case the acceleration of the in-feed conveyor changes from zero or a positive value to a negative value).

The controller may further be configured to accelerate the conveyor surface of the out-feed hold down device away from the cutting plane of the cutting knife as the cutting knife performs a cut. This allows enhanced control of the acceleration of the cut food item portion effectuated by movement of two opposing conveyor surfaces, that of the out-feed conveyor and that of the out-feed hold down device. Accordingly, more effective acceleration is achievable. It further allows for different rates of acceleration of the opposing conveyor surfaces for achieving tilting/rotation of the cut food item portion.

According to an embodiment, the out-feed hold down device comprises a conveyor means having a surface facing the out-feed conveyor surface, and wherein the controller is further configured to accelerate the surface of the out-feed hold down device away from the cutting plane of the cutting knife after the cutting knife has performed a cut, such as immediately after the cutting knife has performed a cut and/or between the cutting knife performs two consecutive cuts.

In embodiments of the invention wherein the conveyor surface of the out-feed conveyor defines a first plane and the conveying surface of the out-feed hold down device defines a second plane, wherein the first and second planes form an angle of 0-25 degrees at least in the vicinity of the cutting plane of the cutting knife, and wherein the cutting plane of the cutting knife forms an angle of 85-95 degrees with the first plane at least in the vicinity of the cutting plane of the cutting knife, the cutting knife may be configured to cut the food item by cutting the food item in a direction from the second plane towards the first plane. This allows the cutting knife to exert a force on the food item in a direction towards the supporting surface of out-feed conveyor for minimising the risk of the food item moving relative to the out-feed conveyor surface while being cut.

In this case, it may be particularly advantageous to have the controller being configured to accelerate the conveyor of the out-feed hold down device at a higher rate than the out-feed conveyor. By 'higher rate' may be understood that the acceleration is larger, such as the change in speed taking place at a higher rate. This allows for timing the acceleration of the conveyor of the out-feed hold down device with the cutting knife in a manner which separates the cut part of the food item away from the uncut part of the food item even as it is being cut, i.e. while the cutting knife is cutting through the food item. Thereby, the risk of the cut food item portion sticking to the cutting knife may be reduced further.

The controller may further be configured to control the conveying speed of the in-feed conveyor, and to keep the conveying speed of the in-feed conveyor constant while the out-feed conveyor is accelerated. Accordingly, the acceleration of the in-feed conveyor is zero during normal operation of the cutting system, which may ease the transfer of food items to the in-feed conveyor, as the device(s) supplying food items to the in-feed conveyor need not take account of any varying speed of the in-feed conveyor during normal operation.

In embodiments of the invention wherein a controller of the cutting system is configured to accelerate the conveying surface of the out-feed conveyor and/or the conveying surface of the out-feed hold down device away from the cutting plane of the cutting knife, the controller may further be configured to decelerate the conveying surface of the out-feed conveyor and/or the conveying surface of the out-feed hold down device after a first period of time. This allows the conveying speed of the out-feed conveyor and the conveyor of the out-feed hold down device to return to its respective original conveying speed, as it was before acceleration away from the cutting plane of cutting knife. Control of the acceleration, deceleration and the first period of time allows control of the distance between individual cut food item portions on the conveyor surface of the out-feed conveyor.

In some embodiments of the invention, a controller of the cutting system is configured to control the conveying speed of the in-feed conveyer and the out-feed conveyor to be the same at the time the food item engages the conveyor surface of the out-feed conveyor. This reduces the risk of the food item being unevenly stretched as it is being cut. Uneven stretching could happen if the food item is stretched and the food item has a non-uniform elasticity. The non-uniform elasticity may arise from, e.g., bones, tendons, fat tissue, a grainy composition, etc. Such uneven stretching could lead to imprecisely controlled cut food item portion size/weight.

In one embodiment, one or more control systems of the cutting system are further configured to receive data from a scanner arranged upstream of the in-feed conveyor, compute a contour on the basis of the received data, and control the height of the out-feed and/or in-feed hold down device on the basis of the computed contour.

The surface of the in-feed hold down device and/or the surface of the out-feed hold down device may be flexible to allow it to adapt at least partially to the contour of a food item for enhanced contact between respective hold down device and the food item or cut food item portion.

According to an embodiment, a part of the out-feed hold down device, such as a part of each of the out-feed hold down device and the in-feed hold down device which is closest to the conveying surface vertically below (or, in case of a non-horizontal out-feed conveyor, in a direction normal to the surface of the out-feed conveyor) and/or closest to the cutting plane, is arranged so as to be displaced, such as displaced at least 1 mm or 2 mm or 5 mm or 10 mm, in a direction orthogonal to said conveying surface and away therefrom by the food items, such as wherein a force applied by the food items for said displacement is equal to or less than 100 Newton, such as equal to or less than 10 Newton, such as equal to or less than 1 Newton. A possible advantage of this may be that food items can displace the in-feed hold down device and/or the out-feed hold down device, which in turn ensures that size of the gap automatically accommodates the size of the food item and/or that the force applied onto the food item is neither too small nor too large. This embodiment may be realized in a multitude of ways, e.g., via arranging the in-feed hold down device and/or the out-feed hold down device so that said displacement involves deforming a spring, an elastic element and/or displacing a weight vertically.

According to an embodiment a distance between the out-feed hold down device and the cutting knife, at least during cutting, is equal to or less than 50 mm, such as equal to or less than 40 mm, such as equal to or less than 30 mm, such as equal to or less than 25 mm, such as equal to or less than 20 mm, such as equal to or less than 15 mm, such as equal to or less than 10 mm, such as equal to or less than 5 mm. An advantage of having a small distance may be that it may ensure a better grip of the food item during cutting may in turn ensure a higher quality of cutting.

According to an embodiment a distance, such as a smallest distance, between the out-feed hold down device and the out-feed conveyor, at least in the absence of food items, is equal to or less than 200 mm, such as equal to or less than 100 mm, such as equal to or less than 50 mm, such as equal to or less than 40 mm, such as equal to or less than 30 mm, such as equal to or less than 25 mm, such as equal to or less than 20 mm, such as equal to or less than 15 mm, such as equal to or less than 10 mm, such as equal to or less than 5 mm. An advantage of having a small distance may be that it reduces a risk that small food items do not reach the out-feed hold down device.

According to an embodiment the system comprises an in-feed hold down device, and wherein a distance, such as a smallest distance, between the in-feed hold down device and the in-feed conveyor, at least in the absence of food items, is equal to or less than 200 mm, such as equal to or less than 100 mm, such a equal to or less than 50 mm, such as equal to or less than 40 mm, such as equal to or less than 30 mm, such as equal to or less than 25 mm, such as equal to or less than 20 mm, such as equal to or less than 15 mm, such as equal to or less than 10 mm, such as equal to or less than 5 mm, such as 0 mm. An advantage of having a small distance may be that it reduces or eliminates a risk that small food items do not reach the in-feed hold down device.

According to an embodiment the system may further comprise a turning apparatus configured to receive and turn incoming food items, such as incoming food items which have been cut by the cutting knife, while being conveyed by a conveyor means, where a longitudinal axis of the incoming food items forms a first angle in relation to a conveying direction of the incoming food items, said turning apparatus comprising:

- a first turner device configured to engage with a front most food item of said incoming food items, and
- a first moving mechanism connected to the first turner device configured to adjust the angular position of the first turner device while engaging with the front most food item, such that the longitudinal axis of the front most food item forms a second angle in relation to the conveying direction of the food items when released by the first turner device.

According to an embodiment the system may further comprise two conveyors arranged for conveying at least some of the food items, optionally at least one of the two conveyors being arranged downstream of the cutting knife, and arranged in an end-to-end arrangement, such as the two conveyors being the in-feed conveyor and the out-feed conveyor, the cutting system further comprising:

a moving mechanism for adjusting the relative position between the two conveyors, such as so as to open or close a gap between them, a control device for controlling the moving mechanism, such as so as to close or open a gap between the two conveyors so that one or more selected food items may fall into the gap while one or more other selected food items are conveyed further downstream.

An example of such two conveyors arranged this way is provided in the application WO2018229206A1, which is hereby incorporated by reference in entirety.

The cutting system as described herein may be incorporated into a food item processing line or system, the food item processing system may comprise e.g. a first cutting system, a turning apparatus and a second cutting apparatus (optionally in that sequence, i.e., with the turning apparatus between a first cutting system and a second cutting system). In a food item processing system, incoming food items may be provided to a first cutting system as described herein, and conveyed by a first infeed conveying means where a first sensing means scans the food items and provides data describing the food items to a controlling means configured for controlling a first cutting system. The first cutting system may be controlled to cut the food items into e.g. food item strips. The food item strips may have a longitudinal axis forming a first angle relative to the conveying direction. The food item processing system may further comprise a turning apparatus arranged to adjust the angular positioning/orientation of the food item strips, for example such that the longitudinal axis of the food item strips is adjusted from a first angle relative to the conveying direction to a second angle relative to the conveying direction, this may e.g. be like turning the strips 90 degrees on the conveying means and keeping the lower side of the food item as the lower side before, during and after the turning. A second sensing means may scan the food item strips on the outfeed conveying means of the turning apparatus and provide data describing the food item strips to a controlling means configured for controlling a second cutting means in a second cutting system. The second cutting system may be controlled to cut the food item strips into e.g. food item cubes. The second cutting system may comprise at least one cutting system e.g. a cutting system as described herein.

In some embodiments of the invention, the cutting system further comprises an in-feed hold down device, wherein the method comprises the step of:

the cutting knife cutting the food item in a cutting plane, while the food item is simultaneously being pressed against the in-feed conveyor and being pressed against the out-feed conveyor.

The simultaneous pressing of the food item against the in- and the out-feed conveyors while the food item is being cut by the cutting knife allows for improved immobility of the food item relative to each of the in- and out-feed conveyors during cutting. This in turn allows for a more controlled cut with minimised undesired movement of the food item during the cut. It further allows for improved control of movement of the food item relative to the cutting plane of the cutting knife during the cut.

In some embodiments of the invention, the method further comprises the step of:

accelerating the conveyor surface of the out-feed conveyor away from the cutting plane of the cutting knife as the cutting knife performs a cut.

Firstly, this may reduce the risk of the cut food item portion on the out-feed conveyor sticking to the cutting knife as it may retract along the same path as it cuts. Secondly, the cut food item portion is accelerated away from the food item and thus also away from the next food item portion being cut, thus reducing the risk of cut food item portions on the out-feed conveyor sticking to each other undesirably. Third, even for non-sticky cut food item portions it may be advantageous to arrange the portions apart on the out-feed conveyor to, e.g., ease the process of picking them out from each other for sorting and/or packaging purposes.

According to an embodiment, the method is further comprising the step of:

accelerating the conveyor surface of the out-feed conveyor away from the cutting plane of the cutting knife after the cutting knife has performed a cut, such as immediately after the cutting knife has performed a cut and/or between the cutting knife performs two consecutive cuts.

According to an embodiment, the method is further comprising the step of:

controlling the conveying speed of the out-feed conveyor, and/or the conveying speed of the in-feed conveyor so that the conveying speed of the out-feed conveyor, such as in a downstream direction away from the cutting plane of the cutting knife, is larger than the conveying speed of the in-feed conveyor, such as in a downstream direction towards the cutting plane of the cutting knife, after the cutting knife has performed a cut, such as immediately after the cutting knife has performed a cut and/or between the cutting knife performs two consecutive cuts.

According to an embodiment, the method is further comprising the step of:

controlling the conveying speed of the out-feed conveyor, and/or the conveying speed of the in-feed conveyor so that the after the cutting knife has performed a cut, such as immediately after the cutting knife has performed a cut, such as immediately after the cutting knife has performed a cut, and/or between the cutting knife performs two consecutive cuts, a distance between the adjacent food items initially on either side of the cutting knife is increased.

The increase in distance may be achieved in a number of ways, including—but not limited to—e.g.:

keeping both of the out-feed conveyor speed and the in-feed conveyor speed constant (i.e., the same before/during/after cutting) with the constant out-feed conveyor speed being larger than the constant in-feed conveyor speed, providing a larger acceleration in the downstream direction after the cut, such as immediately after the cut, of the out-feed conveyor than the in-feed conveyor (note that this larger acceleration in the downstream direction could be provided by increasing the acceleration of the out-feed conveyor and/or decreasing—such as in a negative direction optionally below zero—the acceleration of the in-feed conveyor), decelerating the infeed conveyor and infeed conveyor hold down, just after the cut, to create a separation between the portion on the outfeed side and the remaining meat on the infeed side. In that case, the speeds on outfeed conveyor and outfeed hold down are not necessarily changed. The infeed speeds are then accelerated again after the separation has taken place.

Combinations of the preceding bulleted methods.

BRIEF DESCRIPTION OF THE DRAWINGS

Embodiments of the invention will now be further described with reference to the accompanying drawings, in which.

DETAILED DESCRIPTION OF THE DRAWINGS

Figure 1:
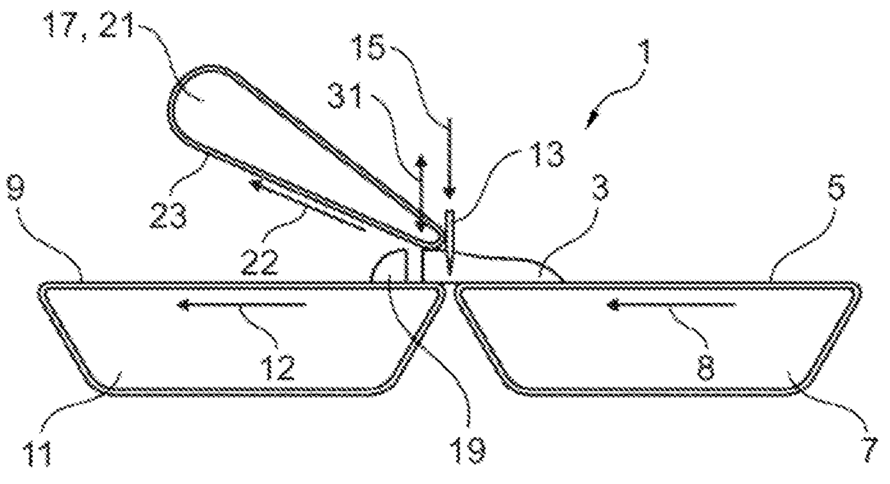
FIG. 1 is a schematic cross-sectional view of an embodied cutting system.

The embodiment of FIG. 1 is a cutting system 1 for cutting food items 3. In the cross-sectional view of FIG. 1, a food item 3 is supported by the in-feed conveying surface 5 of an in-feed conveyor 7 and the out-feed conveying surface 9 of an out-feed conveyor 11. The conveying direction of the in-feed conveyor 7 is indicated by the arrow 8 and the conveying direction of the out-feed conveyor 11 is indicated by the arrow 12. In the depicted situation, the food item 3 is being cut by a cutting knife 13. The cutting knife 13 cuts in a cutting plane indicated by the arrow 15. The cutting plane extends in between the ends of the in- and out-feed conveyors 7,11 and is perpendicular to the first and second planes defined by the conveyor surfaces 5,9 of the in- and out-feed conveyors 7,11 in the vicinity of the cutting plane of the cutting knife 13. Previous to the situation depicted in FIG. 1, the food item 3 at one point engaged the conveying surface 9 of the out-feed conveyor 11 after having been supported by the in-feed conveyor 7 only. The conveying speed of the in-feed conveyor 7 and the out-feed conveyor 11 was the same at the time the food item 3 engaged the out-feed conveying surface 9 of the out-feed conveyor 11. This minimised the risk of the food item 3 being unevenly stretched.

In the embodiment of FIG. 1, the food item 3 is pressed against the out-feed conveyor surface 9 by an out-feed hold down device 17 while the food item 3 is being cut. This helps immobilising the food item relative to the out-feed conveying surface 9, while the food-item is being cut. It further helps immobilising the cut food item portion 19 relative to the out-feed conveying surface 9, after it has been cut form the food item 3.

The out-feed hold down device 17 in FIG. 1 comprises a conveyor 21 having a conveyor surface 23 facing the out-feed conveyor surface 9. This allows for individual control of the conveying speed of the opposing conveyor surfaces 9,23 engaging the food item 3 or cut food item portion 19. The conveying direction of the conveyor 21 of the out-feed hold down device is indicated by the arrow 22. Also in FIG. 1, the conveyor surfaces 9,23 of the out-feed conveyor 7 and the out-feed hold down device 17 are parallel in the vicinity of the cutting plane of the cutting knife 13 for optimising the contact area between the food item 3 or cut food item portion 19, and the conveyor surfaces 9,23. Also, the conveying surface 9 of the out-feed conveyor 11 is perpendicular to the cutting plane of the cutting knife 13 in the vicinity thereof allowing for well-defined cuts by the cutting knife 13.

In the embodiment of FIG. 1, the cutting system 1 comprises a control unit (not shown) configured to control the in-feed conveyor 7 to convey the food item 3 at a first speed, control the out-feed conveyor 11 to convey the food item 3 at a second speed, and control the cutting knife 13 to simultaneously perform a cut while moving at a third speed. In one embodiment, the third speed is at least 10 times larger than both of the first speed and the second speed. Accordingly, the food item 3 is moving while it is being cut by the cutting knife 13. This allows for improved efficiency of the cutting system 1, as the in- and out-feed conveyors 7,11 are conveying the food item 3 while it is being cut. The in- and out-feed conveyors 7,11 may not even have to slow down for the cut to be performed, as the cutting knife 13 moves at a much higher speed than the in- and out-feed conveyors 7,11 when it cuts the food item 3.

The control system of the cutting system 1 of FIG. 1 is further configured to accelerate the conveyor surface 9 of the out-feed conveyor 11 away from the cutting plane of the cutting knife 13 as the cutting knife 13 performs a cut. This creates a distance between the cut food item portion 19 and the food item 3 it has been cut from, as well as from the cutting knife 13. The controller is configured to accelerate the conveyor surface 23 of the out-feed hold down device 17 away from the cutting plane of the cutting knife 13 as the cutting knife 13 performs a cut. This allows more effective acceleration and for different rates of acceleration of the opposing conveyor surfaces 9,23 for achieving tilting/rotation of the cut food item portion 19. The conveying speed of the in-feed conveyor 7 is kept constant by the controller, also while the cutting knife 13 cuts the food item 3.

Figure 2:
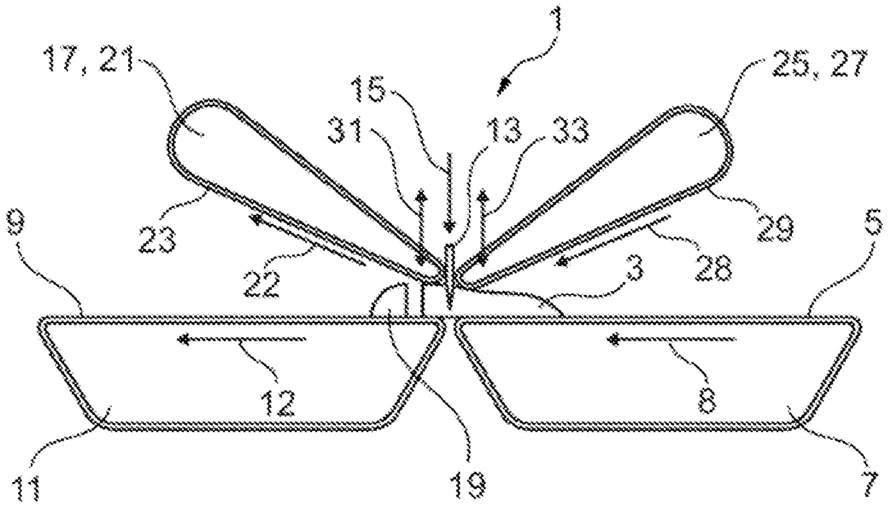
FIG. 2 is a schematic cross-sectional view of another embodied cutting system.

FIG. 2 is a cross-sectional sketch of an embodiment of a cutting system similar to the embodiment of FIG. 1 except that the embodiment of FIG. 2 comprises an in-feed hold down device 25. The in-feed hold down device 25 comprises a conveyor 27 having a conveyor surface 29 facing the in-feed conveyor surface 5. The conveying direction of the conveyor 27 of the in-feed hold down device 25 is indicated by the arrow 28. The conveyor 27 is controlled to move the conveying surface 29 at the same speed as the conveying speed of the in-feed conveyor 7. This ensures that the opposing surfaced 5,29 engaging the food item 3 on the in-feed side of the cutting knife 13 moves in a synchronised manner to avoid dislocation of the food item 3 as it is being cut.

The control systems of the cutting systems 1 of FIGS. 1 and 2 are further configured to receive data from a scanner (not shown) arranged upstream of the in-feed conveyor 7, compute a contour on the basis of the received data, and control the height of the out-feed hold down device 17 on the basis of the computed contour. The height is adjusted by moving the entire out-feed hold down device 17 up or down as illustrated by the arrow 31. This height adjustment can be carried out without changing a distance between the out-feed hold down device 17 and the cutting plane indicated by the arrow 15. In the embodiment of FIG. 2, also the height of the in-feed hold down device 25 is adjusted on the basis of the computed contour by moving it up or down as indicated by the arrow 33. Accordingly, the height of the out-feed hold down device 17, and possibly also the in-feed hold down device 25, is adjusted to follow the contour of the food item 3 or cut food item portion 19 is it passes respective hold down device 17,25.

The following is an example of a sequence of cutting a food item 3 into cut food item portions 19 by use of an embodied method and cutting system 1. First the food item 3 is conveyed on the conveying surface 5 of the in-feed conveyor 7. In the system of FIG. 2, the food item 3 then engages the in-feed hold down device 25 pressing it against the in-feed conveyor 7. The conveying speed of the conveyor 27 of the in-feed hold down device 25 is equal to the conveying speed of the in-feed conveyor 7 (such as the velocity components in a conveying direction of each of the velocities of the in-feed conveyor and the in-feed hold down device are equal) and the height of the in-feed hold down device 25 is adjusted to follow the contour of the food item 3 on the basis of a contour computed from a previous scan.

The food item 3 is then conveyed onto the conveying surface 9 of the out-feed conveyor 11 and engages the conveyor surface 23 of the out-feed hold down device 17. At this stage, the conveying speed of the conveyor 23 of the out-feed hold down device 17 is equal to the conveying speed of the in-feed conveyor 7 and the out-feed conveyor 11. Also, the height of the out-feed hold down device 17 is adjusted to follow the contour of the food item 3 on the basis of a previous scan. The food item 3 is accordingly suspended between the in-feed and out-feed conveyor 9,11 and thereby also in the cutting plane of the cutting knife 13.

The food item 3 is then cut by the cutting knife 13 while being in contact with each of the in-feed conveyor 7, the in-feed hold down device 25, the out-feed conveyor 11 and the out-feed hold down device 17. Just after the cutting knife has cut the food item 3 to form the cut food item portion 19, the out-feed conveyor 11 and the conveyor 21 of the out-feed hold down device 17 accelerates the cut food item portion 19 away from the cutting plane of the cutting knife 13. This acceleration creates a distance between the cut food item portion 19 and the food item 3, as the food item 3 is being conveyed by the in-feed conveyor at constant speed at this stage.

The out-feed conveyor 11 and the conveyor 21 of the out-feed hold down device 17 then decelerate to match the conveying speed of the in-feed conveyor 7 before the food item 3 engages the out-feed conveyor 11 and the out-feed hold down device 17. The sequence is then repeated.

Figure 3:
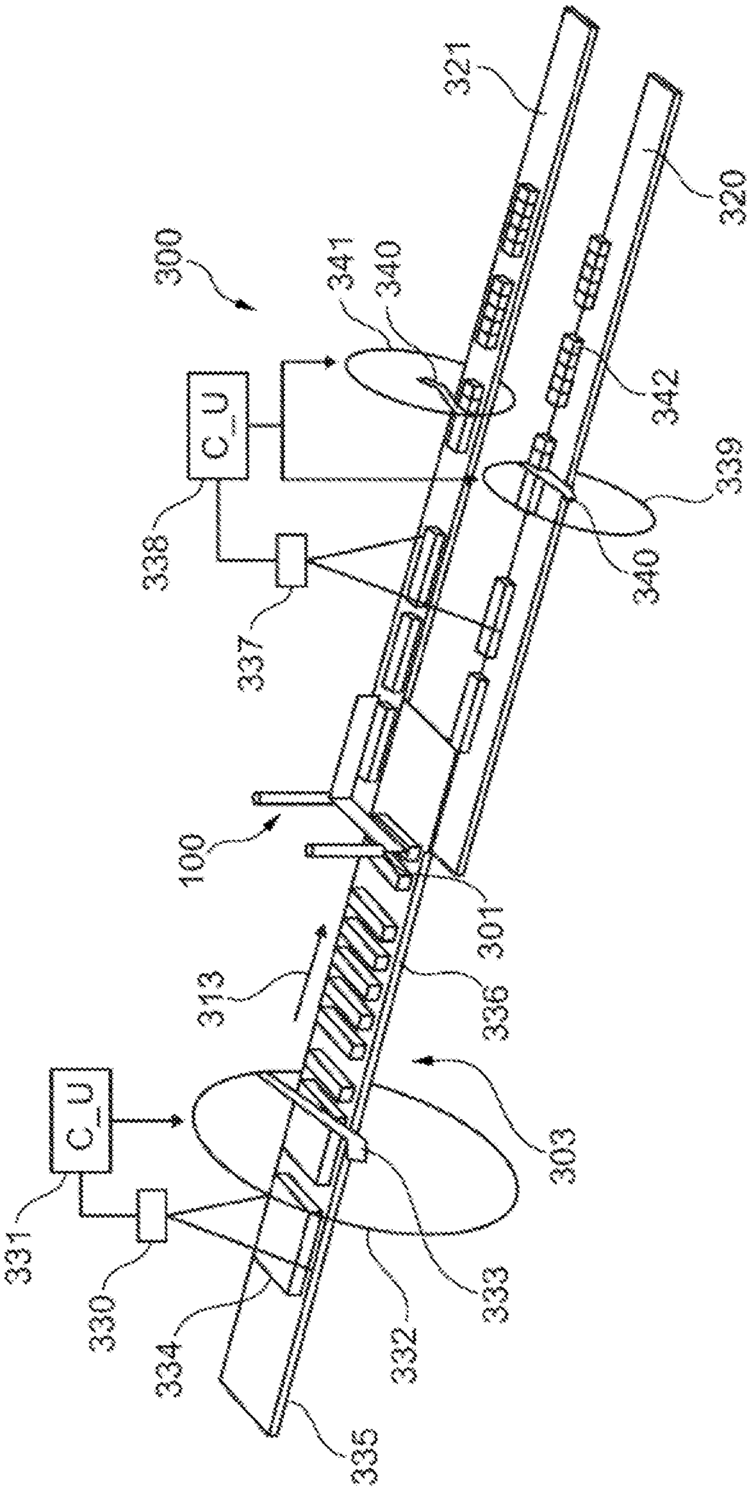
FIG. 3 shows a processing line provided with first cutting system, a turning apparatus and a second cutting system.

As shown in FIG. 3, the cutting system 303 as described herein may be incorporated into a food item processing line or system 300, the system 300 is further provided with a turning apparatus 100 and a second cutting system 340. The system is illustrated by cutting a food item into strips, which afterwards are cut into cubes. Other types of cuts may be performed in such a food item processing line 300. The cutting system 303 may also be a stand-alone system performing one or more cuts in a food item.

FIG. 3 does not illustrate the hold-down device, which may be incorporated in the first cutting system 303 and or into the second cutting system 340.

In the system 300, incoming food items 334 are provided to a first cutting system 303, and conveyed by a first infeed conveying means 335 in a conveying direction 313. A first sensing means 330 scans the food items 334 on the infeed conveying means 335 and provides data describing the food items 334 to a controlling means, such as a computing unit 331, configured for controlling a first cutting means 333. The first cutting means 333 may be controlled to cut the food items 334 into food item strips 301. The food item strips 301 may have a longitudinal axis forming a first angle relative to the conveying direction.

In the illustrated example of FIG. 3, the first cutting means 333 may be positioned to cut the food items 334 in a direction perpendicular to the conveying direction 313, such as by rotation 332 of a blade through a gap defined by the first infeed conveying means 335 and a second infeed conveying means 336. The second infeed conveying means may be arranged to convey the resulting food item strips 301 in the conveying direction 313 to a turning apparatus 100.

The turning apparatus 100 is arranged to adjust the angular positioning of the food item strips 301, for example such that the longitudinal axis of the food item strips is adjusted from a first angle relative to the conveying direction 313 to a second angle relative to the conveying direction 313. In the embodiment according to FIG. 3, the turning apparatus 100 further moves the food item strips 301 from the second infeed conveying means 336 to an outfeed conveying means 320, 321 of the second cutting apparatus comprising the cutting means 340.

A second sensing means 337 scans the food item strips 301 on the outfeed conveying means 320, 321 and provides data describing the food item strips 301 to a controlling means, such as a computing unit 338, configured for controlling a cutting means 340. The cutting means 340 may be controlled to cut the food item strips 301 into food item cubes 342.

In the illustrated example of FIG. 3, the cutting means 340 may be positioned to cut the food items, such as food item strips 301 in a direction perpendicular to the conveying direction 313 by rotation 339, 341 of a blade at a gap (not shown) defined by the outfeed conveying means 320, 321.

The invention claimed is:

1. A cutting system for cutting food items, the cutting system comprising:
- an in-feed conveyor arranged for speed control and including an in-feed conveyor surface;
- an out-feed conveyor arranged for speed control and including an out-feed conveyor surface, the in-feed and the out-feed conveyors being arranged in an end-to-end arrangement;
- a cutting knife defining a cutting plane within which it moves as it performs a cut, the cutting plane being defined between the ends of the in-feed and the out-feed conveyors;
- an in-feed hold down device including a surface facing the in-feed conveyor surface and being arranged in relation to the in-feed conveyor surface;
- an out-feed hold down device including a surface facing the out-feed conveyor surface and being arranged in relation to the out-feed conveyor surface to apply an out-feed pressure in a direction of the conveyor surface of the out-feed conveyor onto a portion of a food item resting on the out-feed conveyor surface while it is being cut by the cutting knife; and
- a computing unit configured to control the cutting knife to perform a cut, an out-feed conveying speed of the out-feed conveyor, and an in-feed conveying speed of the in-feed conveyor;
- wherein the surface of the in-feed hold down device applies an in-feed pressure onto a portion of the food item resting on the in-feed conveyor surface while being cut by the cutting knife;
- wherein the out-feed pressure applied by the out-feed hold down device creates a friction between the food item and the conveyor surface of the out-feed conveyor large enough to immobilize the food item relative to the conveyor surface without causing an unacceptable deformity in the food item;

wherein the cutting knife is configured to cut the food item in the cutting plane while the food item is simultaneously pressed against both the in-feed conveyor and the out-feed conveyor;

wherein the out-feed conveying speed is defined in a downstream direction away from the cutting plane of the cutting knife and the in-feed conveying speed is defined in a downstream direction towards the cutting plane of the cutting knife;

wherein the computing unit is arranged to increase the out-feed conveying speed from a first speed to a second speed within a first time period defined as within 1 second after the cutting knife performs a cut;

wherein the computing unit is arranged to decrease the out-feed conveying speed from the second speed to the first speed after the first time period.

2. The cutting system according to claim 1, wherein subsequently after the cutting knife has performed a cut, a distance between adjacent food items initially on either side of the cutting knife is increased.

3. The cutting system according to claim 1, wherein the computing unit is configured to accelerate the conveyor surface of the out-feed conveyor away from the cutting plane of the cutting knife between two consecutive cuts performed by the cutting knife.

4. The cutting system according to claim 1, wherein the in-feed hold down device comprises a conveyor having a conveyor surface facing the in-feed conveyor surface.

5. The cutting system according to claim 1, wherein the out-feed hold down device comprises a conveyor means having a surface facing the out-feed conveyor surface.

6. The cutting system according to claim 1, wherein the computing unit is configured to accelerate the conveyor of the out-feed hold down device at a higher rate than the out-feed conveyor.

7. The cutting system according to claim 1, wherein the computing unit is further configured to keep the in-feed conveying speed constant while the out-feed conveying speed is accelerated from the first speed to the second speed.

8. The cutting system according to claim 1, wherein the surface of the in-feed hold down device the surface of the out-feed hold down device is flexible to allow it to adapt at least partially to a contour of a food item.

9. The cutting system according to claim 1, wherein a part of the out-feed hold down device which is closest to the conveying surface vertically below is arranged so as to be displaced in a direction orthogonal to said conveying surface and away therefrom by the food items, wherein a force applied by the food items for said displacement is equal to or less than 100 Newton so as to be displaced at least 10 mm by the applied force of equal to or less than 100 Newton.

10. The cutting system according to claim 1, further comprising a turning apparatus configured to receive and turn incoming food items which have been cut by the cutting knife, while being conveyed by a conveyor means, where a longitudinal axis of the incoming food items forms a first angle in relation to a conveying direction of the incoming food items, said turning apparatus including:

a first turner device configured to engage with a front most food item of said incoming food items, and a first moving mechanism connected to the first turner device configured to adjust an angular position of the first turner device while engaging with the front most food item, such that the longitudinal axis of the front most food item forms a second angle in relation to the conveying direction of the food items when released by the first turner device.

11. The cutting system according to claim 1, wherein the first and second conveying speeds are the same when the food item engages the conveyor surface of the out-feed conveyor and before the cutting knife has performed a cut.

12. The cutting system according to claim 1, wherein the surface of the out-feed hold down device has a lower coefficient of friction relative to the coefficient of friction of the conveyor surface of the out-feed conveyor.

13. A method of cutting a food item by use of a cutting system, the cutting system having: a cutting knife; an in-feed conveyor including an in-feed conveyor surface; an out-feed conveyor including an out-feed conveyor surface, the in-feed and the out-feed conveyors being arranged in an end-to-end arrangement; an out-feed hold down device, and an in-feed hold down device including a surface facing the in-feed conveyor surface and being arranged in relation to the in-feed conveyor surface, the method comprising the steps of:

conveying a food item on the conveyor surface of the in-feed conveyor;

the food item engaging the conveyor surface of the out-feed conveyor;

the out-feed hold down device pressing the food item against the conveyor surface of the out-feed conveyor; and the cutting knife cutting the food item in a cutting plane, while the food item is at least being pressed against the out-feed conveyor, wherein the surface of the in-feed hold down device applies an in-feed pressure onto a portion of a food item resting on the in-feed conveyor surface while being cut by the cutting knife;

the method further comprising the step of:

controlling an out-feed conveying speed of the out-feed conveyor and an in-feed conveying speed of the in-feed conveyor;

wherein the out-feed pressure applied by the out-feed hold down device creates a friction between the food item and the conveyor surface of the out-feed conveyor large enough to immobilize the food item relative to the conveyor surface without causing an unacceptable deformity in the food item;

wherein the out-feed conveying speed is defined in a downstream direction away from the cutting plane of the cutting knife and in-feed conveying speed is defined in a downstream direction towards the cutting plane of the cutting knife;

wherein the out-feed conveying speed is increased from a first speed to a second speed within a first time period defined within 1 second after the cutting knife performs a cut;

wherein the out-feed conveying speed is decreased from the second speed to the first speed after the first time period.

14. The method of cutting according to claim 13, wherein the cutting system further comprises an in-feed hold down device, and wherein the method further comprises the step of: the cutting knife cutting the food item in a cutting plane, while the food item is simultaneously being pressed against the in-feed conveyor and being pressed against the out-feed conveyor.

15. The method according to claim 13, wherein after the cutting knife has performed a cut immediately after the cutting knife has performed a cut or between the cutting knife performs two consecutive cuts, a distance between adjacent food items initially on either side of the cutting knife is increased.

16. The method according to claim 13, wherein a part of the out-feed hold down device which is closest to the conveying surface vertically below is arranged to be displaced in a direction orthogonal to said conveying surface and away from by the food items.

17. The method according to claim 13 further comprising the step of applying a tilting speed to the out-feed hold down device along the surface facing the out-feed conveyor surface to tilt a cut food portions having a greater height to width ratio.

* * * * *